M. W. BEYLIKGY.
Extracting Rubber from Waste.
No. 168,129. Patented Sept. 28, 1875.
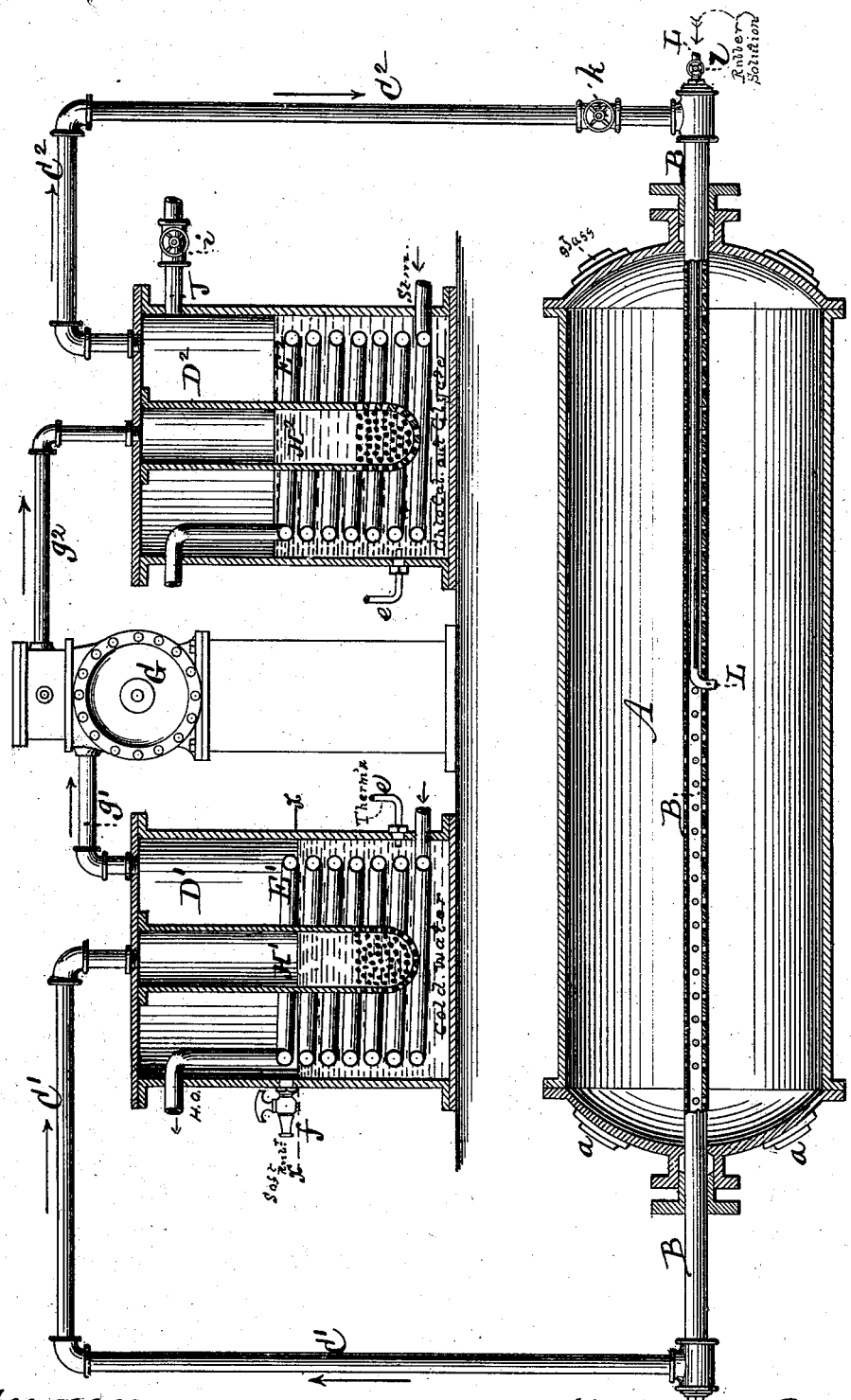
Witnesses:
Michael Ryan
Fred. Haynes
Marc. W. Beylikgy
by his Attorneys
Brown & Allen

UNITED STATES PATENT OFFICE.

MARC W. BEYLIKGY, OF TENAFLY, NEW JERSEY.

IMPROVEMENT IN EXTRACTING RUBBER FROM WASTE.

Specification forming part of Letters Patent No. 168,129, dated September 28, 1875; application filed March 19, 1875.

*To all whom it may concern:*

Be it known that I, MARC W. BEYLIKGY, of Tenafly, in the county of Bergen and State of New Jersey, have invented certain Improvements in Means for Extracting Rubber from Waste; and I do hereby declare that the following is a full, clear, and exact description of the same, reference being had to the accompanying drawing, which forms part of this specification.

My invention relates to certain improvements which are especially intended for use in establishments where rubber clothing, shoes, and other rubber fabrics are manufactured, for the purpose of extracting the rubber from the fibrous material of the "cuttings" and other fragments included in the general term "waste," in order that both the rubber and the fibrous material may be utilized.

My invention consists in a novel process or system of surface evaporation by means of steam and air, whereby a rubber solution, obtained in the usual or any suitable manner, is solidified and rendered fit for use; and, further, in a novel combination and arrangement of parts in an apparatus for carrying out my improved process of surface evaporation.

In carrying out my invention the rubber-lined cuttings are treated with any of the ordinary solvents of rubber—commercial naphtha being preferable—for the purpose of dissolving the rubber linings. The proportions I have found most efficacious are about eight parts in weight of naphtha to one part of rubber; and I also find it desirable to keep the temperature of the solvent at about 160° Fahrenheit, and to stir occasionally. When the rubber is completely dissolved it is separated from the fibrous material by means of a centrifugal exhauster, which may be of any suitable construction, but arranged to run at a very high speed. The machine should be well covered in order to prevent the access of air thereto, which might result in considerable loss of the volatile solvent, and consequent imperfect separation. It is, therefore, desirable to avoid the use of solvents of great volatility, such as disulphide of carbon, or even naphtha containing ethereal hydrocarbons.

If proper care and attention be observed in the dissolving and separating processes the amount of rubber adhering to the fibrous material after said processes will be insignificant; but if the fibrous material is of such a character as to render its saving desirable, it may be again saturated with the solvent, and the separating process may be repeated.

When the fibrous material is of such a character that it is desirable to save it by reason of the color of the dye, if said material has become stained by tar or lamp-black contained in the rubber, it is submitted to another kind of treatment with a view to restoring the original brightness of the color. As soon as the separation of rubber is complete the cuttings are removed from the centrifugal machine to a washer of suitable construction, containing a mixture of naphtha and fatty oil, in the proportions of about one-tenth naphtha and nine-tenths oil. The viscosity of the oil causes the lamp-black to be loosened from the fibrous material, and renders it capable of being readily washed off with naphtha. The washings are then collected in suitable apparatus and submitted to distillation, in order to regain the naphtha, and the residuum of distillation may be used for various purposes, such as roofing, &c. When the rubber has been dissolved and entirely separated from the fibrous material, the next step to be taken in order to utilize it is to restore it to a solid state.

The evaporation of dissolved rubber is attended with many difficulties. If carried on in ordinary evaporating-vessels a portion of the rubber will solidify and adhere to the sides of the vessel, and will destroy the heating-surfaces in proportion as it gains in thickness, producing a coating which is an imperfect conductor of heat, and which, being overheated, will either become vulcanized, if it is prepared rubber, or else will be melted and destroyed. If the evaporation is attempted by forcing steam into the solution the result will be imperfect and unsatisfactory. The vulcanizing materials with which rubber is usually prepared for manufacturing purposes consist, mainly, of sulphur and oxide or oxycarbonate of lead. Their chemical reaction and corresponding production of sulphide of lead contribute so powerfully to the vulcanization of rubber that the same is performed more readily than with free sulphur. The presence of steam, which is favorable to the chemical reaction referred to, causes the vulcanization to take place at a temperature still lower than where dry heat is used. As the steam condenses the rubber solution is transformed into an emulsive mass, and as the solvent evaporates, and the rubber partly solidifies, numerous cavities are formed, which are filled with vapor, and have interposed between them rubber diaphragms or membranous envelopes of considerable strength and poor conducting properties. In order to acquire the necessary expansive power to enable them to break through these envelopes, the vapors contained in the cells must reach a very high temperature, even when aided by a partial vacuum, and the vulcanization or the destruction of the rubber will immediately follow.

The object of my invention is to overcome the difficulties above enumerated; and, in order to enable those skilled in the art to which my invention appertains to make and use the same, I will proceed to describe one form of apparatus by which the evaporating process may be successfully conducted, reference being had to the accompanying drawing, representing a vertical section of the apparatus.

A represents the part of the apparatus which I call the solidifier. It consists of a hollow cylinder arranged to revolve around a perforated hollow shaft, B, the ends of which are connected to pipes $C^1$ $C^2$ communicating with two airtight vessels, $D^1$ $D^2$. The ends of the cylinder A are provided with glasses $a$ to admit light and enable the interior to be inspected from the outside.

In the vessel $D^1$, which I call a condenser, is placed a coil of pipe, $E^1$, the ends of which pass through the sides of the vessel and communicate with the water-tank or reservoir. The vessel $D^1$ contains a sufficient quantity of cold water to cover the coil $E^1$ or to rise as high as the line $x\ x$.

In the vessel $D^2$, which I call a calorifier, is placed a coil of pipe, $E^2$, the ends of which pass through the sides of the vessel and communicate with a steam-generator. The vessel $D^2$ contains, in sufficient quantity to cover the coil $E^2$, a liquid which is capable of sustaining a very high temperature, such as glycerine, solution of chloride of calcium, or other suitable fluid. The use of liquid in the two vessels, may, however, be dispensed with, provided the radiating surfaces of the coils be so increased as to correspond with their evaporating capacity. Both vessels are provided with thermometers $e$, and the condenser is provided with a cock, $f$.

Between the condenser $D^1$ and calorifier $D^2$ is located a pump, G, the suction-chamber of which communicates with the condenser by a pipe, $g^1$, and with the calorifier by a pipe, $g^2$. These pipes pass through the tops of the vessels $D^1$ $D^2$. To the end of the pipe $C^1$ is attached a distributer, $H^1$, consisting of a pipe with its lower end rounded and perforated, and extending down into the vessel nearly to the bottom thereof, and inside of the coil $E^1$. To the lower end of the pipe $g^2$ is attached a distributer, $H^2$, similar in construction and arrangement to the distributer $H^1$. The calorifier is provided near its top with an outlet-pipe, J, furnished with a valve, $i$. The pipe $C^2$ is provided with a valve, $k$, near the point where said pipe connects with the hollow shaft. A pipe, L, passes into and through the hollow shaft B for a portion of its length, the inner end of the pipe L communicating with the interior of the solidifier A, and its outer end communicating with a vessel containing a quantity of rubber solution.

The several parts of the apparatus being arranged as described with relation to each other, with the valve $i$ open and the valve $k$ closed, and the pump G in operation, the air in the solidifier A will become so rarefied that when the valve $l$ is opened the rubber solution, actuated by the atmospheric pressure upon its surface in the vessel which contains it, will flow into the solidifier through the pipe L. When a sufficient quantity of such solution has been admitted, the solidifier is caused to revolve, whereupon the solution spreads itself upon the interior surface of the vessel. A current of cold water is then admitted to the coil $E^1$ in the condenser $D^1$, and a current of steam into the coil $E^2$ in the calorifier $D^2$, and the valve $k$ is opened and the valves $i$ and $l$ are closed. The air will then circulate in the directions indicated by the arrows passing up and along the pipe $C^1$ down through the distributer $H^1$, bubbling through the water in the condenser $D^1$ to the space above the surface, from which it is drawn through the pipe $g^1$ by the pump G and forced through the pipe $g^2$, passing down through the distributer $H^2$, bubbling up through the liquid in the calorifier $D^2$ to the space above the surface, from whence it passes through the pipe $C^2$ to the perforated hollow shaft B, escaping through the perforations in jets or streams and impinging against the rubber solution on the interior surface of the solidifier A, and again passing through the pipe $C^1$, as before.

When the required difference of temperature between the two vessels $D^1$ $D^2$ is established, the air which becomes heated in passing through the calorifier, rushing through the perforated hollow shaft upon the layer of rubber on the interior surface of the solidifier, will promote the evaporation of the volatile solvent, and aid greatly in effecting its separation, as it lifts the vapors mechanically into the condenser. The air, thus saturated with the vapors of the volatile solvent, while bubbling through the colder contents of the condenser, in accordance with the hygrometrical principles—i. e., the theory of formation of rain—is discharged of the whole amount of vapor in excess of its capacity of saturation at this lower temperature. This portion of vapor becomes liquefied, and, being specifically lighter than water, and insoluble in it, floats upon the surface of the water in the condenser, and may be drawn off by the cock $f$. The air is so discharged of excess of vapor, traveling again through the calorifier and becoming reheated, its capacity of saturation is restored to the former ratio. A fresh proportion of vapors will then redissolve while rushing into the solidifier, and the operation above described will continue until the volatile solvent is exhausted.

To insure success in the operation, it is of the utmost importance to guard against accumulating too much liquor in the condenser. If the quantity exceeds the proportion that might be held in suspension in the mass of water, being divided finely in consequence of brisk agitation of the same, occasioned by the current of air that traverses it, it will form a thick stratum, and be carried mechanically into the calorifier with the circulating air, which, while being heated, will become saturated with the vapor, and its evaporating capacity upon the contents of the solidifier will be destroyed. On the contrary, if the circulating air be rather saturated with moisture its evaporating capacity will be greatly increased; for, as the heat developed by the condensation of steam is far greater than the specific heat of dry air, the quantity of caloric stored in a given volume of air is larger when it is damp than when it is dry. Furthermore, as it is possible, by judicious admission of a proper quantity of steam into the circulating air, to so manage the operation that the required caloric for the evaporation of the solvent may be almost entirely supplied by the steam which will condense on effecting the said evaporation, the temperature of the blast may be kept invariable, and the operation be performed at a far lower temperature than would otherwise be required—say, 160° Fahrenheit.

If the rubber operated upon is a poor composition, it is liable to become detached from the sides of the solidifier in small lumps, increasing in size by rolling and gathering additional quantities. The central portions of these lumps being isolated from the contact of the hot air, remain soft. To prevent such an occurrence, an iron roller may be inserted in the solidifier, so as to roll upon the interior surface thereof durings its revolution, and press out such lumps and spread them against such interior surface.

If the rubber acted upon consists wholly or in part of Carthagena gum, it will remain soft and sticky, even after thorough evaporation of the solvent and long exposure to hot air, unless measures are taken to prevent it. To render it tough and dry, it is desirable to mix with it some solid substance having a strong molecular affinity for rubber, such as lampblack, sulphide of lime, &c., before submitting it to the solidifying process.

After the first supply of rubber solution has been solidified, a fresh supply may be introduced into the solidifier and operated upon as before. When a sufficient quantity has accumulated upon the interior surface of the solidifier one of the heads of the vessel is detached and moved back on the shaft, and the solidified rubber is removed in a sheet or sheets from the interior surface, and exposed to the air until it becomes entirely free from naphtha, and is ready to be again used in the manufacture of various articles.

It will be seen that the main or most important feature of this invention consists in the action of the evaporating medium always upon a free surface exposed to its effect, and never penetrating through the mass. This process offers further advantages, as the ingredients are more easily incorporated with rubber in a state of solution, and more readily separated from coarse impurities by straining than by the ordinary process of operating upon solid rubber.

When the cuttings are coated with vulcanized rubber, and are composed of valuable materials, such as scarlet-colored felts and flannels, the separation may be effected either by steeping the waste in rectified oil of turpentine, which will cause the rubber to swell and become so fragile as to be easily separated from the fibrous material by a pressing and rubbing process in a suitable apparatus, or else by destroying the rubber. For this latter purpose I employ the following method, which is based upon the fact, which I have observed, that the vulcanized rubber, when heated in the presence of a large percentage of rosin, will be very easily disintegrated and become fluid. The waste is soaked in a mixture of one part of crude turpentine or gum, melted in an equal part of lard-oil, and mixed with four parts of petroleum-naphtha, and exposed to a uniform heat of about 230° Fahrenheit, in an apparatus so arranged as to collect the naphtha which distils. When the disintegration of rubber has become complete it is washed off from the fibrous material by a steady stream of fresh naphtha, until said material is clean, after which the washings are submitted to distillation to regain the naphtha. If the fibrous material has been stained by lamp-black contained in the rubber it is subjected to the treatment hereinbefore described for the purpose of removing said stains.

Having thus fully described my invention, I do not limit myself to the precise details herein set forth, nor to the exact construction of the apparatus shown herein.

What I claim as my invention, and desire to secure by Letters Patent, is—

1. The process of solidifying rubber solutions by surface evaporation, through the agency of a current of air which is made to circulate continuously and repeatedly over the surface of said solution, through a condenser to deposit the volatile solvent, and through a heater back to the vessel containing the solution, substantially as specified.

2. An apparatus for solidifying rubber solutions, composed of a solidifier, a condenser, and a calorifier, combined to operate substantially as described.

MARC W. BEYLIKGY.

Witnesses:
BENJAMIN W. HOFFMAN,
FRED. HAYNES.